United States Patent [19]

Ramacciotti

[11] 4,280,784
[45] Jul. 28, 1981

[54] ANIMAL CARCASS HANDLING VEHICLE

[76] Inventor: William S. Ramacciotti, 13603 Q St., Omaha, Nebr. 68137

[21] Appl. No.: 19,091

[22] Filed: Mar. 9, 1979

[51] Int. Cl.³ .............................................. B66F 9/12
[52] U.S. Cl. ...................................... 414/722; 17/24; 294/67 D; 296/102; 414/914; D15/32
[58] Field of Search ............... 414/622, 680, 684, 685, 414/722, 723, 745, 910, 911, 743, 607, 914, 608; 294/32, 67 R, 67 D, 67 A, 67 AB, 68, 73, 79; 198/342; 280/5 A, 755, 756; 180/6.48; 296/102; 17/24

[56] References Cited

U.S. PATENT DOCUMENTS

| | | | |
|---|---|---|---|
| 1,301,997 | 4/1919 | Becker | 198/342 X |
| 2,549,166 | 4/1951 | Brandt | 280/755 X |
| 2,756,886 | 7/1956 | Schaffer | 414/607 |
| 3,226,857 | 1/1966 | Porter et al. | 414/685 X |
| 3,369,686 | 2/1968 | Vondra | 414/722 X |
| 3,718,222 | 2/1973 | Foster | 414/723 |
| 3,790,183 | 2/1974 | Price | 280/5 A |

FOREIGN PATENT DOCUMENTS 1160153 12/1963 Fed. Rep. of Germany ........... 414/680

*Primary Examiner*—Leslie J. Paperner
*Attorney, Agent, or Firm*—Zarley, McKee, Thomte, Voorhees & Sease

[57] ABSTRACT

The vehicle of this invention is a skid-steer type having a pair of boom arms pivotally mounted thereon and extending forwardly therefrom. An animal carcass handling bucket is pivotally mounted on the forward end of the lift arms and is adapted to receive a pair of beef quarters or the like therein and to support the same in an upright position. The vehicle includes a propane tank at the upper rearward end thereof which has a guard extending therearound to prevent the propane tank from coming into contact with hanging meat. A rollover protection structure is also provided on the vehicle and a guard is secured to the upper end thereof for preventing the structure from coming into contact with hanging meat. The vehicle is ideally suited to handle two quarters of beef or the like at one time, transporting them from meat rails and loading them into refrigerated trailers or the like.

3 Claims, 11 Drawing Figures

ANIMAL CARCASS HANDLING VEHICLE

BACKGROUND OF THE INVENTION

This invention relates to a skid-steer vehicle for use in meat handling operations.

In slaughter houses or packing plants, sides of beef are normally supported on meat rails. Ordinarily, the sides of beef are initially supported by means of a hook extending through the rear quarter. The sides of beef remain suspended until shipment from the slaughter house.

In years past, it was customary to separate the sides of beef by cutting the front quarter from the upper quarter and for a "beef lugger" to then carry the separated quarter of beef to the refrigerated car or trailer. A beef lugger would also carry the remaining quarter to the trailer or car.

The lugging of beef is extremely tiresome work and requires considerable time and labor to accomplish the same.

Therefore, it is a principal object of the invention to provide a vehicle which may be used to transport quarters of meat within packing or slaughter house facilities.

A further object of the invention is to provide a skid-steer vehicle which may be used to transport meat quarters within packing facilities.

A further object of the invention is to provide a skid-steer vehicle having an animal carcass bucket mounted on the forward end thereof which supports the carcass quarters in an upright position therein.

A further object of the invention is to provide a skid-steer vehicle for use in meat handling operations which includes guard means thereon to prevent contact between the vehicle and the hanging meat.

A still further object of the invention is to provide a skid-steer vehicle for use in meat handling operations which is economical of manufacture, durable in use and refined in appearance.

These and other objects will be apparent to those skilled in the art.

SUMMARY OF THE INVENTION

Figure 1:
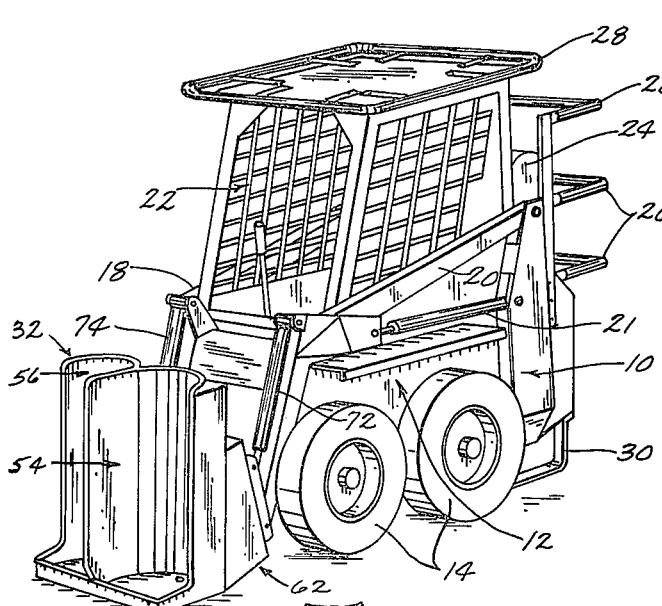
FIG. 1 is a perspective view of the skid-steer vehicle of this invention.
Figure 2:
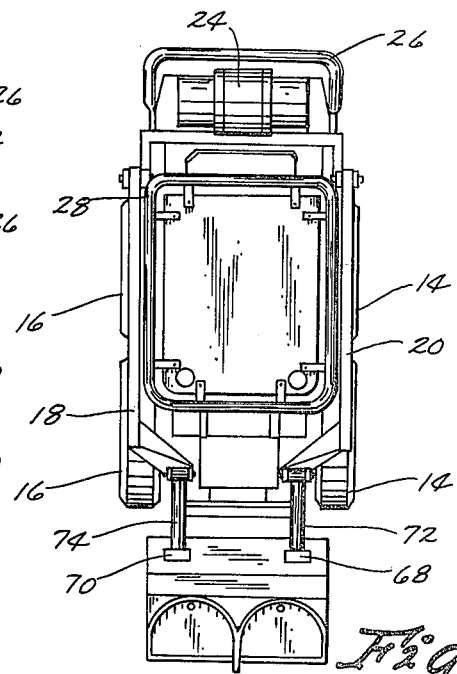
FIG. 2 is a top view of the vehicle.
Figure 3:
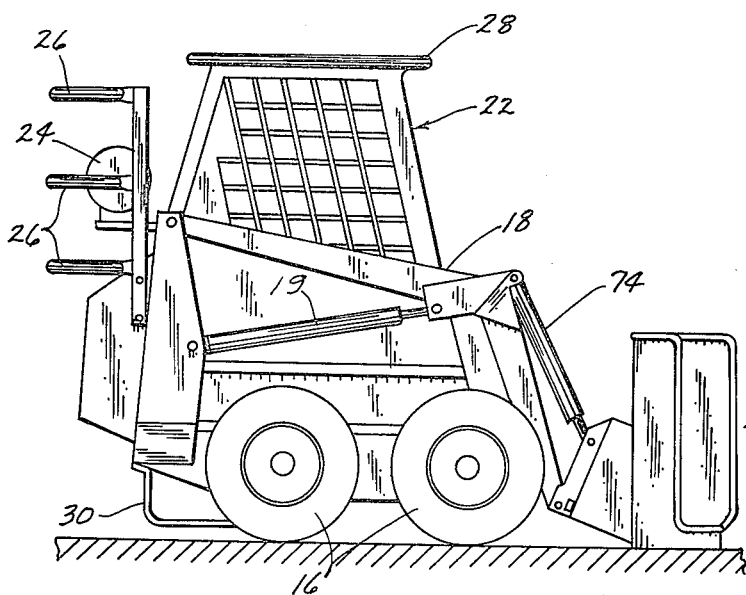
FIG. 3 is a side view of the vehicle.
Figure 4:
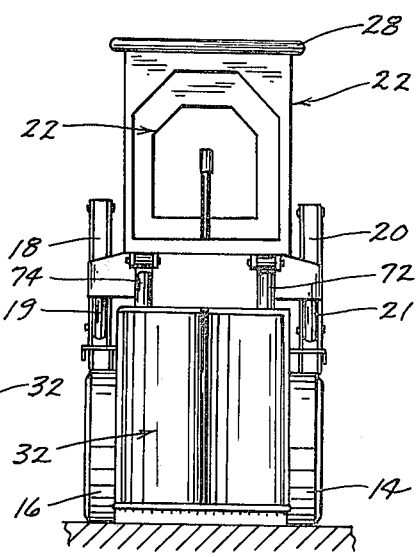
FIG. 4 is a front veiw of the vehicle.

A skid-steer vehicle is disclosed for use in the meat packing or slaughter industry. A carcass bucket is pivotally mounted to the forward ends of the loader arms and is adapted to support two quarters of beef or the like therein in an upright position. The vehicle is used to transport the meat from the cooler to the refrigerated trailers or cars. The vehicle is also provided with guards to prevent the vehicle from coming into contact with the meat hanging on the meat rails.

DESCRIPTION OF THE PREFERRED EMBODIMENT

The numeral 10 refers generally to a conventional skid-steer vehicle such as the Bobcat 310 manufactured by Melroe Division, Clark Equipment Company, Fargo, North Dakota. Generally speaking, the vehicle includes a frame means 12 having a pair of wheels 14 at one side thereof and a pair of wheels 16 at the other side thereof. Each pair of wheels may be independently rotated in either forwardly or rearwardly directions in conventional fashion so as to achieve the desired maneuverability.

A pair of loader arms or boom arms 18 and 20 are pivotally connected at their rearward ends to the vehicle and extend forwardly therefrom. Lift cylinders 19 and 21 are provided for raising and lowering the boom arms 18 and 20 in customary fashion. The numeral 22 refers to a rollover protection structure or operator's guard which is mounted on the vehicle. It is this vehicle which is adapted so as to be suitable for use in meat packing or slaughter operations.

Figure 5:
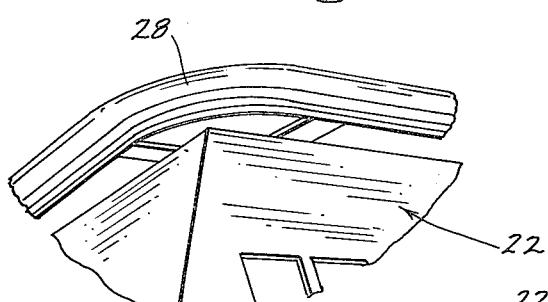
FIG. 5 is a partial rear perspective view of the guard at the upper corner of the rollover protection cage.
Figure 6:
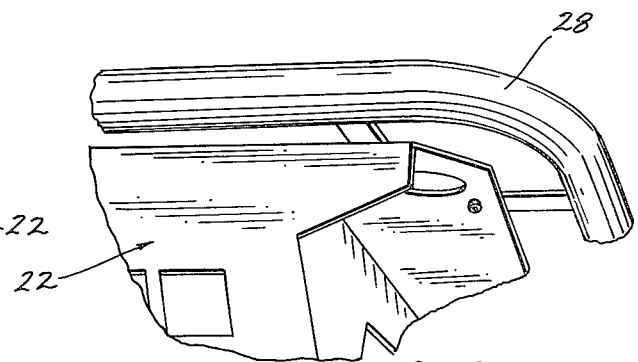
FIG. 6 is a partial front perspective view of the guard at the upper corner of the rollover protection cage.
Figure 7:
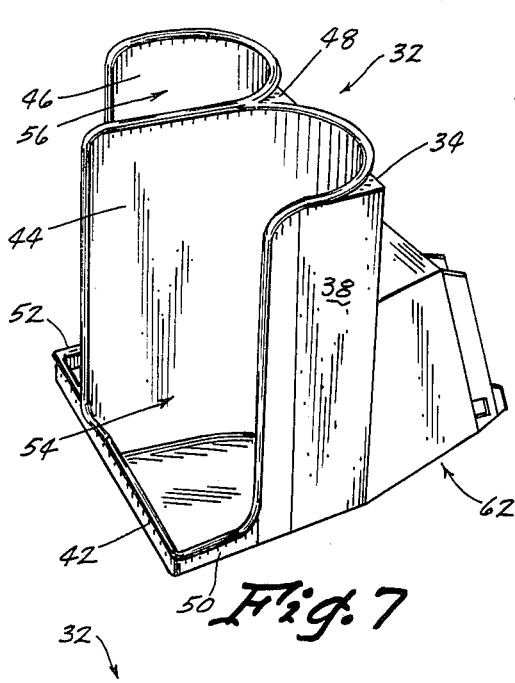
FIG. 7 is a front perspective view of the carcass bucket.
Figure 8:
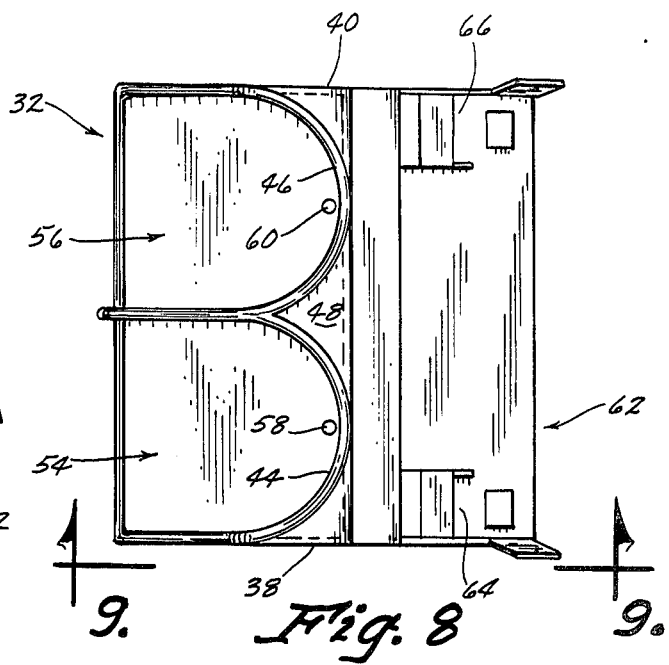
FIG. 8 is a top view of the carcass bucket.
Figure 9:
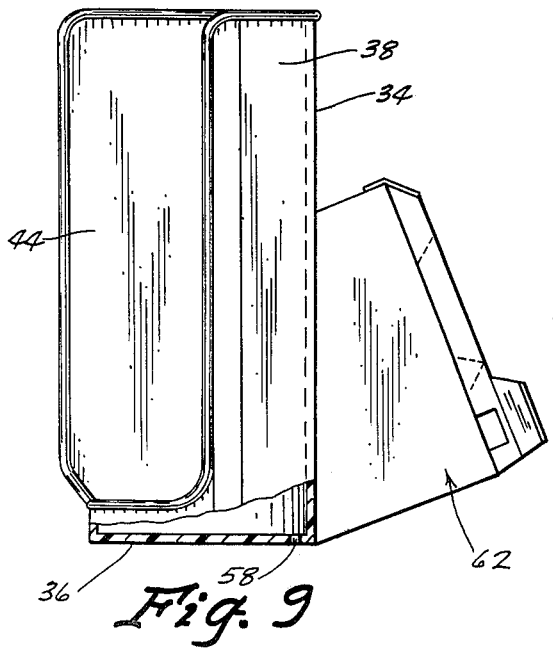
FIG. 9 is a sectional view as seen on lines 9—9 of FIG. 8.
Figure 10:
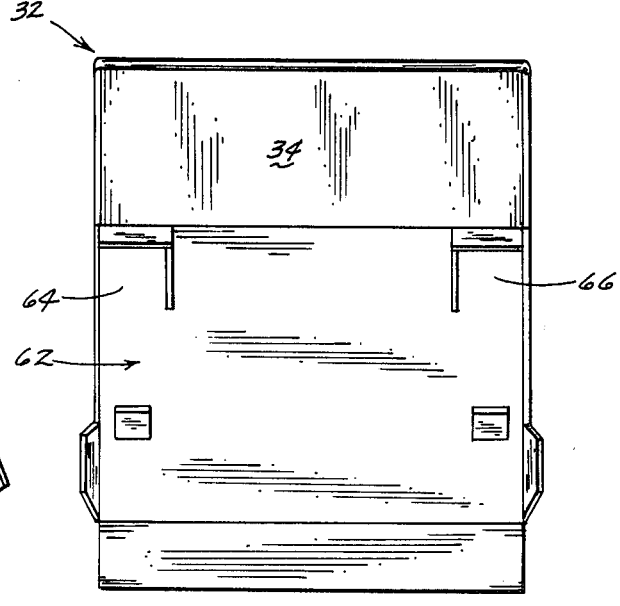
FIG. 10 is a back view of the carcass bucket.

Orindarily, the loader 10 is of the gasoline engine type which is unsuited for use in meat packing operations. The engine of the vehicle is converted to propane with a propane tank 24 being mounted at the upper rearward end of the vehicle. A guard 26 is secured to the rearward end of the vehicle and extends around the propane tank and a portion of the lower rearward portion of the vehicle to prevent the propane tank and portions of the rearward end of the vehicle from coming into contact with meat hanging on the meat rails. A guard 28 is secured to the upper end of the cage 22 and is spaced outwardly therefrom as seen in FIGS. 5 and 6 to prevent the sharp corners at the upper end of the cage 22 from coming into contact with the hanging meat. In other words, the sharp corners at the upper end of the cage 22 would gouge or pierce the sides of meat hanging on the rail and such gouging would lower the quality of the meat. It should also be mentioned that the cage 22 is ordinarily painted when it leaves the factory. The factory paint on the cage 22 normally contains lead and the use of paint containing lead in meat packing operations is prohibited. Thus, the factory paint is removed from the cage 22 by sandblasting and the cage 22 is then hot-dipped galvanized.

Figure 11:
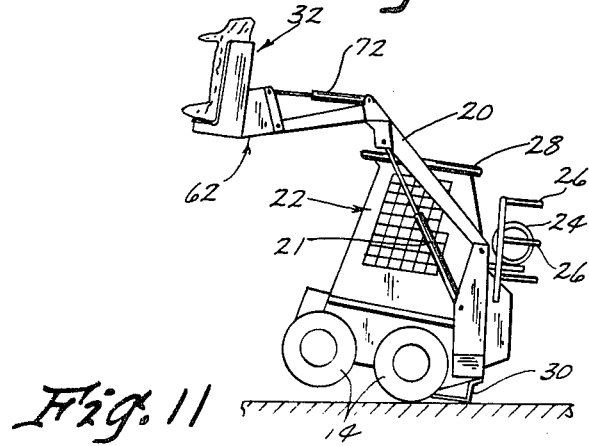
FIG. 11 is a side view of the vehicle.

The numeral 30 refers to a skid guard which is mounted at the lower rearward end of the vehicle to prevent objectionable rearward tipping of the vehicle during the operation of the same as illustrated in FIG. 11. It has been found that the skid guard 30 is necessary or desirable since the modification of the Melroe vehicle adversely affects the weight distribution of the vehicle and the vehicle has a tendency to tip rearwardly at times during the operation of the same. Thus, the guard 30 engages the supporting surface to limit the rearward tipping of the vehicle as seen in FIG. 11.

The numeral 32 refers to the meat handling or carcass handling bucket which is mounted on the forward ends of the loader arms 18 and 20. For purposes of description, bucket 32 will be described as comprising a back wall portion 34, bottom wall portion 36 which extends forwardly from the lower end of back wall portion 34, side wall portions 38 and 40 which extend forwardly from the opposite sides of back wall portion 34, and front wall portion 42 which extends upwardly for approximately two inches at the forward end of bottom wall portion 36. A pair of substantially U-shaped arcuate wall portions 44 and 46 are positioned between the side wall portions 38 and 40 and extend upwardly from bottom wall portion 36 as illustrated in the drawings. The adjacent walls of arcuate wall portions 44 and 46 are welded together at their forward ends while the outer side edges are welded to the forward portions of side walls 38 and 40.

As seen in the drawings, a top wall member 48 is welded to the upper portions of side walls 38, 40, back wall 34 and rearward sides of arcuate portions 44 and 46 to seal the upper end of the bucket. Wall members 50 and 52 extend rearwardly from the outer sides of front wall portion 42 and are welded to arcuate wall portions 44 and 46 adjacent the lower ends thereof as illustrated in the drawings. All of the edges of the bucket are provided with rolled or round surfaces to prevent gouging of the meat being handled. The arcuate portions 44 and 46 define meat receiving areas 54 and 56 which are adapted to accommodate quarters of beef in an upstanding position. It is very important that the quarters of meat be supported in an upright or upstanding position since the quarters are suspended in an upright or upstanding position on the meat rails and will likewise be supported in the car or trailer.

The numeral 62 refers to a housing which is welded to the rearward side of back wall 34. Housing 62 has a pair of rearwardly presented "pockets" 64 and 66 which are adapted to be detachably received by the "quick attach" assemblies 68 and 70 pivotally mounted on the forward ends of boom arms 18 and 20. Tilt cylinders 72 and 74 are pivotally connected at their upper ends to the boom arms 18 and 20 respectively and are pivotally connected at their rod ends to the assemblies 68 and 70 respectively to permit the tilting of the bucket 32 as desired.

In use, the vehicle is driven into the cooler or the like and positioned adjacent the meat hanging on the meat rails. Ordinarily, a packing house employee will then sever the lower quarters (front) from a pair of sides of beef and position the same in the areas 54 and 56. Preferably, the bucket 32 is positioned below the sides of beef so that the front quarters drop into the areas 54 and 56 as they are separated from the hindquarters which are still supported on the meat rail. The operator then maneuvers the vehicle and transports the same to the awaiting car or trailer. Hooks are then placed through the front quarters and the boom arms are raised to facilitate an employee hanging the quarters on rails within the car or trailer. The vehicle is then driven to the cooler and maneuvered so that the rear quarters of the sides of beef may be positioned in the areas 54 and 56 with the unloading operation then being repeated. The bottom wall 36 should have a pair of openings 58 and 60 provided therein to provide drain holes in areas 54 and 56 for cleaning purposes.

Thus it can be seen that a novel skid-steer vehicle has been provided which greatly simplifies the lugging or handling of beef or the like in packing house operations. It can therefore be seen that the invention accomplishes at least all of its stated objectives.

I claim:
1. In combination,
a skid-steer vehicle having rearward and forward ends and a pair of boom arms pivotally secured at one end to said vehicle and extending forwardly therefrom,
and an animal carcass handling bucket mounted on the forward end of said boom arms,
said vehicle having a protective cage extending around the operator's station, said cage having an open forward end, spaced apart side portions, a rearward end and an upper end, and a guard means mounted on the upper end of said cage and spaced outwardly therefrom for preventing the upper end of said cage from coming into contact with hanging animal carcasses.

2. The combination of claim 1 wherein a propane tank is mounted on the upper rearward end of said vehicle and wherein a guard means extends around said propane tank to prevent said tank from coming into contact with hanging animal carcasses.

3. The combination of claim 1 wherein a skid guard is secured to the lower rearward end of said vehicle.

* * * * *